US009505141B2

(12) United States Patent
Duey

(10) Patent No.: US 9,505,141 B2
(45) Date of Patent: Nov. 29, 2016

(54) FOLDING KNIFE WITH DUAL OPERATIONAL MODES

(71) Applicant: Mentor Group, L.L.C., Oregon City, OR (US)

(72) Inventor: Wes Duey, Oregon City, OR (US)

(73) Assignee: Benchmade Knife Co., Inc., Oregon City, OR (US)

( * ) Notice: Subject to any disclaimer, the term of this patent is extended or adjusted under 35 U.S.C. 154(b) by 143 days.

(21) Appl. No.: 14/426,390

(22) PCT Filed: Aug. 21, 2013

(86) PCT No.: PCT/US2013/055901
§ 371 (c)(1),
(2) Date: Mar. 6, 2015

(87) PCT Pub. No.: WO2014/039254
PCT Pub. Date: Mar. 13, 2014

(65) Prior Publication Data

US 2015/0239134 A1 Aug. 27, 2015

Related U.S. Application Data

(60) Provisional application No. 61/698,654, filed on Sep. 9, 2012.

(51) Int. Cl.
*B62B 1/06* (2006.01)
*B62B 1/04* (2006.01)
(Continued)

(52) U.S. Cl.
CPC ................. *B26B 1/046* (2013.01); *B26B 1/04* (2013.01); *B26B 1/048* (2013.01); *B26B 1/06* (2013.01)

(58) Field of Classification Search
CPC ........... B26B 1/06; B26B 1/04; B26B 1/046; B26B 1/02; B26B 1/048
USPC ........................................... 30/155, 158–161
See application file for complete search history.

(56) References Cited

U.S. PATENT DOCUMENTS 2,741,841 A 4/1956 Egeth
3,834,022 A 9/1974 Students
(Continued)

FOREIGN PATENT DOCUMENTS

| | | |
|---|---|---|
| FR | 2793182 | 11/2000 |
| FR | 2836854 | 9/2003 |
| WO | WO2004/071250 | 8/2004 |

OTHER PUBLICATIONS

Extended European Search Report from European Patent Application No. 13834961.8, which is a European counterpart to this US application, and associated documents.

*Primary Examiner* — Phong Nguyen
(74) *Attorney, Agent, or Firm* — Hancock Hughey LLP

(57) ABSTRACT

A folding knife has dual operational mode. In a first modality, the knife is opened and closed manually. In a second modality, the knife is fully automatic. The user is able to switch between modalities with manipulation of a slider bar in the space between handle halves. The user is able to switch from the automatic mode into the manual mode, and vice versa, only when the blade is in the open position. A torsion spring around the pivot shaft connects the blade to the handle. The spring drives the blade open in the automatic operational mode and a switch mechanism is used to alternately engage and disengaged the spring from the blade. One end of the spring is fixed to the handle and the other end interacts with a groove in the tang of the blade when the switch mechanism is in the automatic position. A spacer bar that is part of the switch mechanism has a surface that is operable to laterally displace the spring relative to the blade groove when the switch is in the manual position. The knife also has dual modes of closed-stop functionality.

20 Claims, 6 Drawing Sheets

(51) Int. Cl.
*B26B 1/04* (2006.01)
*B26B 1/06* (2006.01)

(56) References Cited

U.S. PATENT DOCUMENTS

| | | | | |
|---|---|---|---|---|
| 4,974,323 | A | 12/1990 | Cassady | |
| 5,029,354 | A | 7/1991 | Boyd, Jr. et al. | |
| 5,044,079 | A | 9/1991 | Gibbs | |
| 5,815,927 | A * | 10/1998 | Collins | B26B 1/048 30/155 |
| 5,819,414 | A | 10/1998 | Marifone | |
| 5,915,792 | A | 6/1999 | Sakurai | |
| 5,964,035 | A | 10/1999 | Poehlmann | |
| 6,308,420 | B1 | 10/2001 | Moser | |
| 6,363,615 | B1 | 4/2002 | Moser | |
| 6,574,869 | B1 | 6/2003 | McHenry et al. | |
| 6,651,344 | B2 | 11/2003 | Cheng | |
| 6,675,484 | B2 | 1/2004 | McHenry et al. | |
| 6,732,436 | B2 | 5/2004 | Moizis | |
| 7,086,157 | B2 | 8/2006 | Vallotton | |
| 7,107,686 | B2 | 9/2006 | Linn et al. | |
| 7,243,430 | B1 | 7/2007 | Lerch | |
| 7,278,213 | B2 | 10/2007 | Perdue et al. | |
| 7,293,360 | B2 | 11/2007 | Steigerwalt et al. | |
| 7,296,355 | B2 | 11/2007 | Onion | |
| 7,313,866 | B2 | 1/2008 | Linn et al. | |
| 7,325,312 | B1 | 2/2008 | Janich | |
| 7,380,340 | B1 | 6/2008 | Lerch | |
| 7,437,822 | B2 | 10/2008 | Flagg et al. | |
| 7,603,778 | B1 | 10/2009 | Lerch | |
| 7,627,951 | B2 | 12/2009 | Glesser | |
| 7,676,931 | B2 | 3/2010 | Knight et al. | |
| RE41,259 | E | 4/2010 | McHenry et al. | |
| 7,698,821 | B2 | 4/2010 | Ralph | |
| 7,748,122 | B2 | 7/2010 | Duey | |
| 7,827,697 | B2 * | 11/2010 | Lake | B26B 1/044 30/159 |
| 7,918,028 | B2 | 4/2011 | Steigerwalt et al. | |
| D639,632 | S | 6/2011 | Freeman et al. | |
| 8,046,923 | B2 | 11/2011 | Liu | |
| 8,171,645 | B2 | 5/2012 | Duey | |
| 8,375,590 | B2 | 2/2013 | Duey | |
| 8,572,851 | B2 | 11/2013 | Duey | |
| 2002/0124415 | A1 | 9/2002 | Mizutani et al. | |
| 2003/0140500 | A1 | 7/2003 | Cheng | |
| 2004/0154170 | A1 | 8/2004 | Kain et al. | |
| 2004/0158991 | A1 | 8/2004 | Freeman | |
| 2004/0261272 | A1 | 12/2004 | Moser | |
| 2005/0223562 | A1 * | 10/2005 | Pardue | B26B 1/046 30/161 |
| 2006/0059694 | A1 | 3/2006 | Carter | |
| 2006/0064877 | A1 | 3/2006 | Vallotton | |
| 2007/0068002 | A1 * | 3/2007 | Onion | B26B 1/044 30/161 |
| 2007/0137047 | A1 | 6/2007 | Kim | |
| 2007/0169354 | A1 | 7/2007 | Ralph | |
| 2007/0180702 | A1 | 8/2007 | Haw et al. | |
| 2008/0201953 | A1 | 8/2008 | Bremer et al. | |
| 2009/0056146 | A1 | 3/2009 | Duey | |
| 2009/0119926 | A1 | 5/2009 | Nenadic | |
| 2009/0265939 | A1 | 10/2009 | Chu | |
| 2009/0277015 | A1 | 11/2009 | Duey | |
| 2009/0288301 | A1 | 11/2009 | Hawk et al. | |
| 2010/0140059 | A1 | 6/2010 | Kagami et al. | |
| 2011/0099817 | A1 * | 5/2011 | Duey | B26B 1/048 30/159 |
| 2011/0162211 | A1 | 7/2011 | Maxey | |
| 2012/0047746 | A1 | 3/2012 | Caswell | |
| 2012/0234142 | A1 | 9/2012 | Onion | |

* cited by examiner

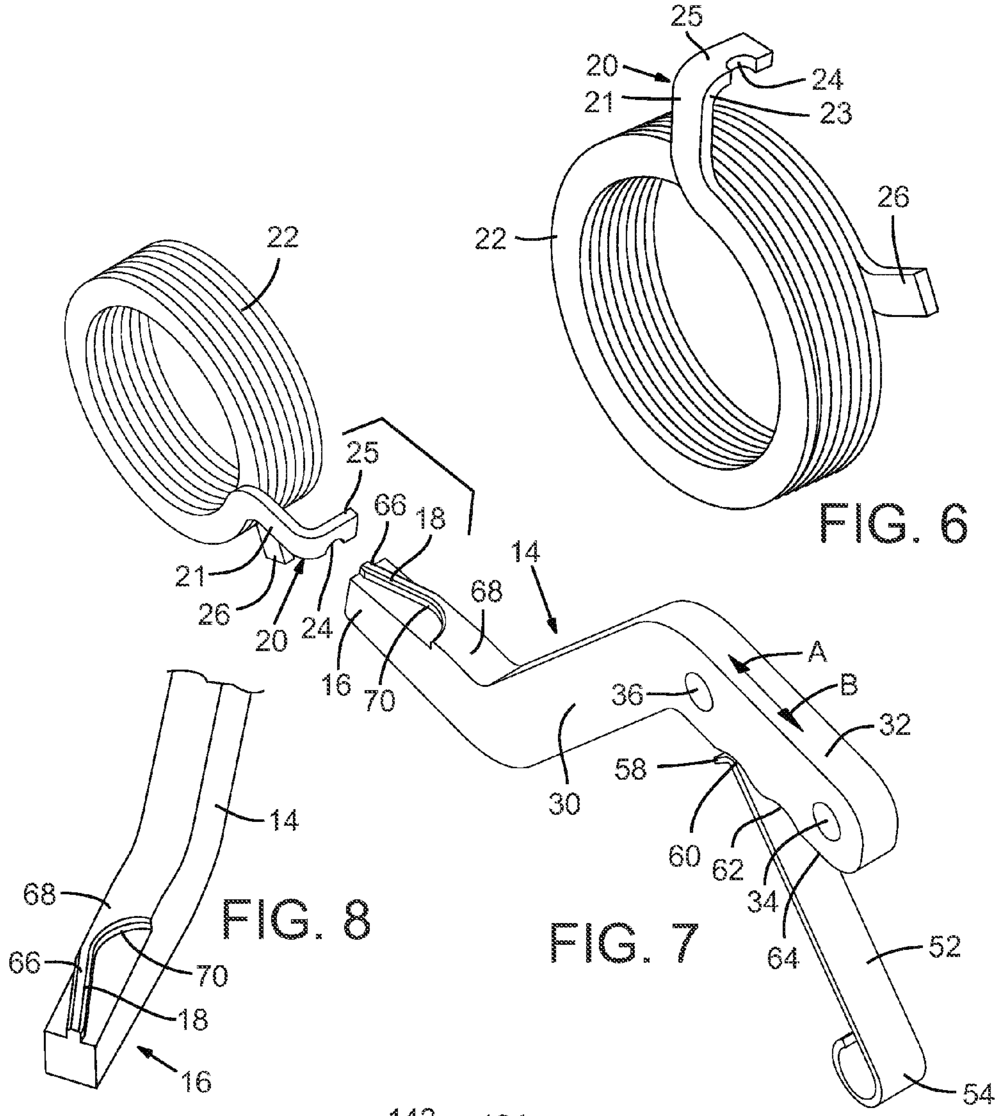
FIG. 6
FIG. 7
FIG. 8
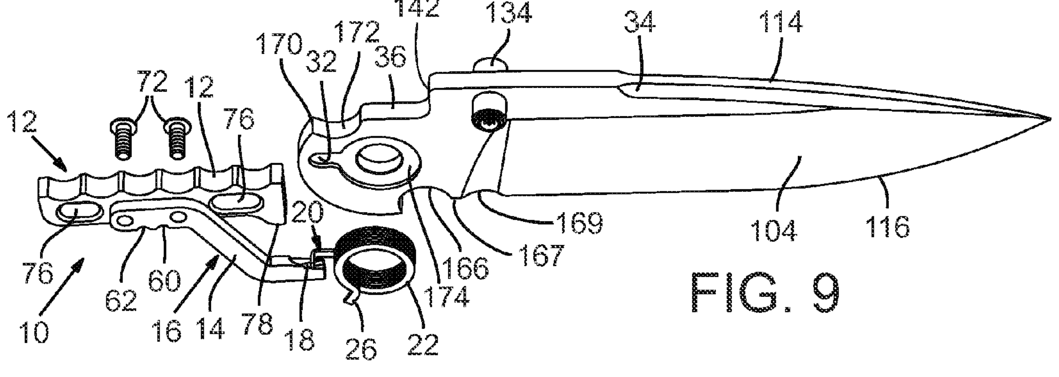
FIG. 9

FOLDING KNIFE WITH DUAL OPERATIONAL MODES

TECHNICAL FIELD

The present relates to knives, and more particularly, to a folding knife that is capable of operating in dual operational modes, the first being a manual mode in which the blade is movable from the stowed or closed position to the open position, and vice versa, by manual manipulation, and the second being an automatic mode in which the blade is driven from the closed position to the open position automatically under spring force. The knife includes mechanisms that allow the operator to switch between the two modes of operation.

BACKGROUND INFORMATION

Folding knives are invaluable tools that are used in many aspects of everyday life, and there are many, many types and styles of folding knives. A "manual" folding knife is a very traditional type of tool in which the knife blade is manually movable by the user between a closed or stowed position in which the sharp edge of the blade is held safely within the handle, and an open position in which the blade is extended in an operable position. Most modern versions of manually operated folding knives include locking mechanisms that lock the blade in the open position—the safety benefits of such locks are obvious. There are innumerable variations on these basic themes.

Automatic folding knifes are nearly as ubiquitous as manual folders. These knives include some type of a mechanism—almost always a spring-driven mechanism—that drives the blade from the closed position toward the open position when the user activates the automatic triggering mechanism, typically by pushing a button or analogous activating mechanism. Generally speaking, in a knife that has an automatic opening mechanism the blade is held in the closed position by a latched trigger mechanism. When the blade is in the closed position the blade is under a constant "pre-load" pressure from a spring mechanism. When the trigger is released, the blade is automatically driven by the spring mechanism into the open position. As with most modern versions of manual knives, most automatic folding knives include locks that lock the blade in the open position. When the user "unlocks" the blade to move it from the open position to the closed position, the rotation of the blade as it is pivoted to the closed position reloads the spring mechanism so that the blade is ready to fire again when desired.

Most folding knives, whether manual or automatic, incorporate some kind of a mechanism that holds the blade or working implement in the closed position in which the sharp edge of the blade is held safely within the handle. There are many known mechanisms for retaining blades in the closed position, and there are obvious reasons why such mechanisms are used. Among other reasons, blade-retaining mechanisms prevent unintended opening of the knife and thus promote safety. As noted, most folding knives also include mechanisms that lock the blade in the open position, again, primarily as a safety feature.

Manual and automatic knives have many uses and can be used in many different settings, and that has led to a demand expressed by many knife users for knives that are operable in dual modes, both automatic and manual. There are benefits to be had in knives that have dual modes of operation and there are a few known dual mode knives. For instance, dual mode knives are described in U.S. Pat. Nos. 7,603,778 and 8,046,923. These knives combine the functionality of both manual and automatic knives and are thus very versatile.

Nonetheless, there is a continuing need for improved mechanisms for enabling dual operational modes in a folding knife, manual and automatic.

The present invention comprises a folding knife having mechanisms that facilitate use of the knife in dual operational modes. In a first modality, the knife is opened and closed manually. In a second modality, the knife is fully automatic. The user is able to switch between modalities with manipulation of a slider bar in the space between handle halves. In a preferred embodiment, the knife may be switched from the automatic mode into the manual mode, and vice versa, only when the blade is in the open position. This is an important safety feature and is very useful from an operational perspective because when the blade is in the open position it is under spring pressure that continues to push the blade toward the open position; the user must make a conscious decision with the blade in the open position to operate the knife in either the manual or automatic mode.

The knife utilizes a torsion spring around the pivot shaft that connects the blade to the handle. The spring drives the blade from the closed to the open position in the automatic operational mode and a switch mechanism is used to alternately engage and disengaged the spring from the blade. One end of the spring is fixed to the handle and the other end of the spring interacts with a specially formed grooved portion in the tang of the blade when the switch mechanism is in the automatic position. A bar that is part of the switch mechanism has a surface that is operable to engage the spring so that the spring is lifted out of the grooved portion in the tang of the blade when the switch is in the manual position.

BRIEF DESCRIPTION OF THE DRAWINGS

The invention will be better understood and its numerous objects and advantages will be apparent by reference to the following detailed description of the invention when taken in conjunction with the following drawings.

In FIG. 3 the position of the blade in the closed position is shown in phantom lines.

FIG. 6 is a perspective view of the spring used in the present invention to drive the blade, showing the first leg that is fixed to the handle and the second leg that selectively engages the blade and which has a notch that interacts with the switch mechanism.

FIG. 7 is a perspective view of the slider bar used in the present invention shown juxtaposed adjacent the spring to illustrate the surface on the forward end of the slider bar and the notch in the second leg of the spring and how these two structures interact.

FIG. 8 is a close up view of the operational tip of the slider bar showing its angled ramp that interacts with the notch in the second leg of the spring.

FIG. 9 is an upper perspective view of the blade, spring, slider bar and the spacer bar—the spacer bar is the "button" that the user manipulates to switch between operational modes.

DETAILED DESCRIPTION OF ILLUSTRATED EMBODIMENTS

A first illustrated embodiment of a folding knife 100 incorporating mechanisms allowing the knife to selectively operate in either a manual or an automatic mode according to the present invention is illustrated in FIGS. 1 through 9. Before the switch mechanism 10 is described in detail, the basic structural features of knife 100 will be described.

Figure 1:
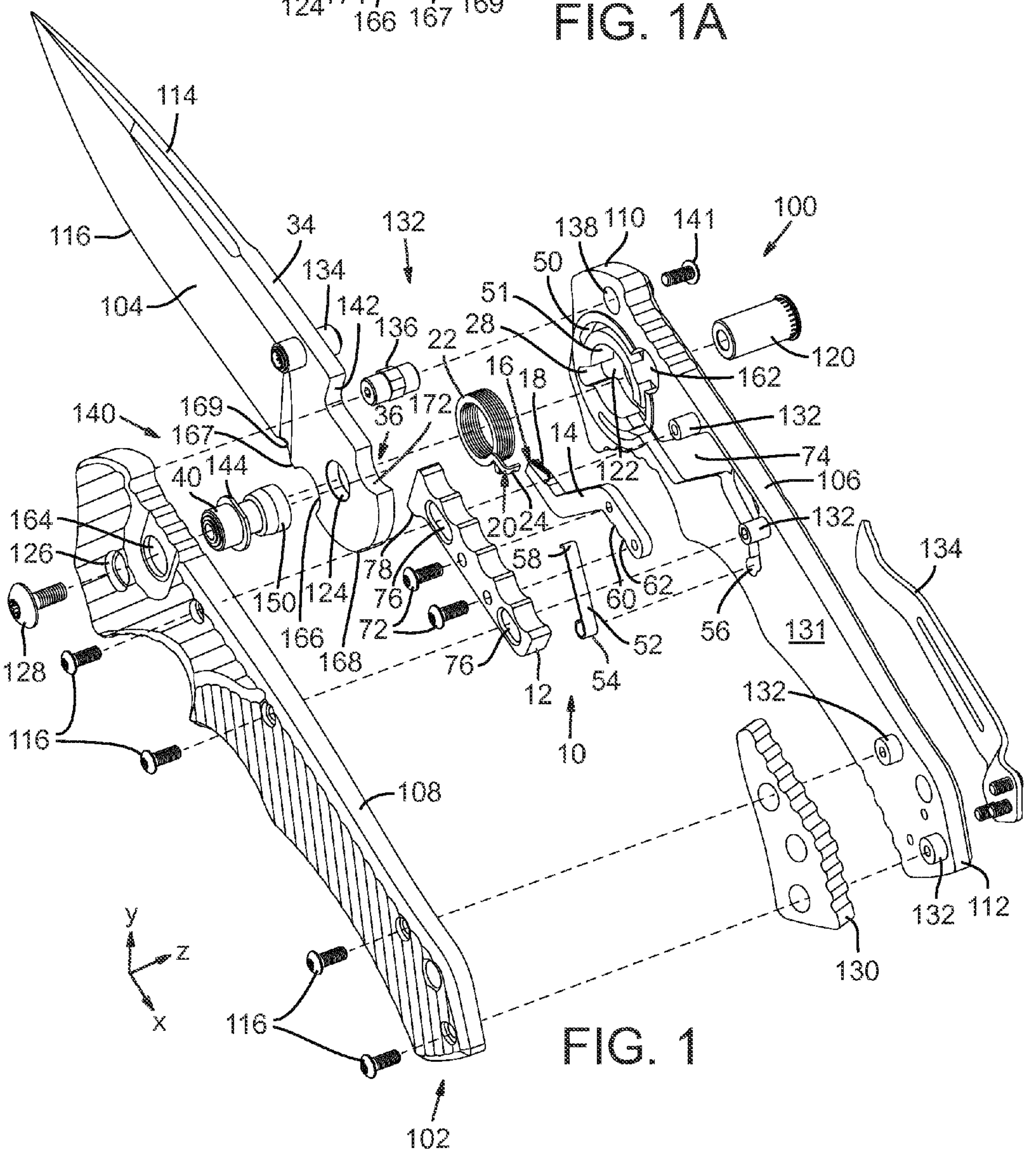
FIG. 1 is a top perspective and exploded view of a folding knife of the type that incorporates the mechanisms that facilitate the dual operational modes, automatic on the one hand and manual on the other, according to the present invention, and illustrating the "left" side of the knife.
Figure 2:
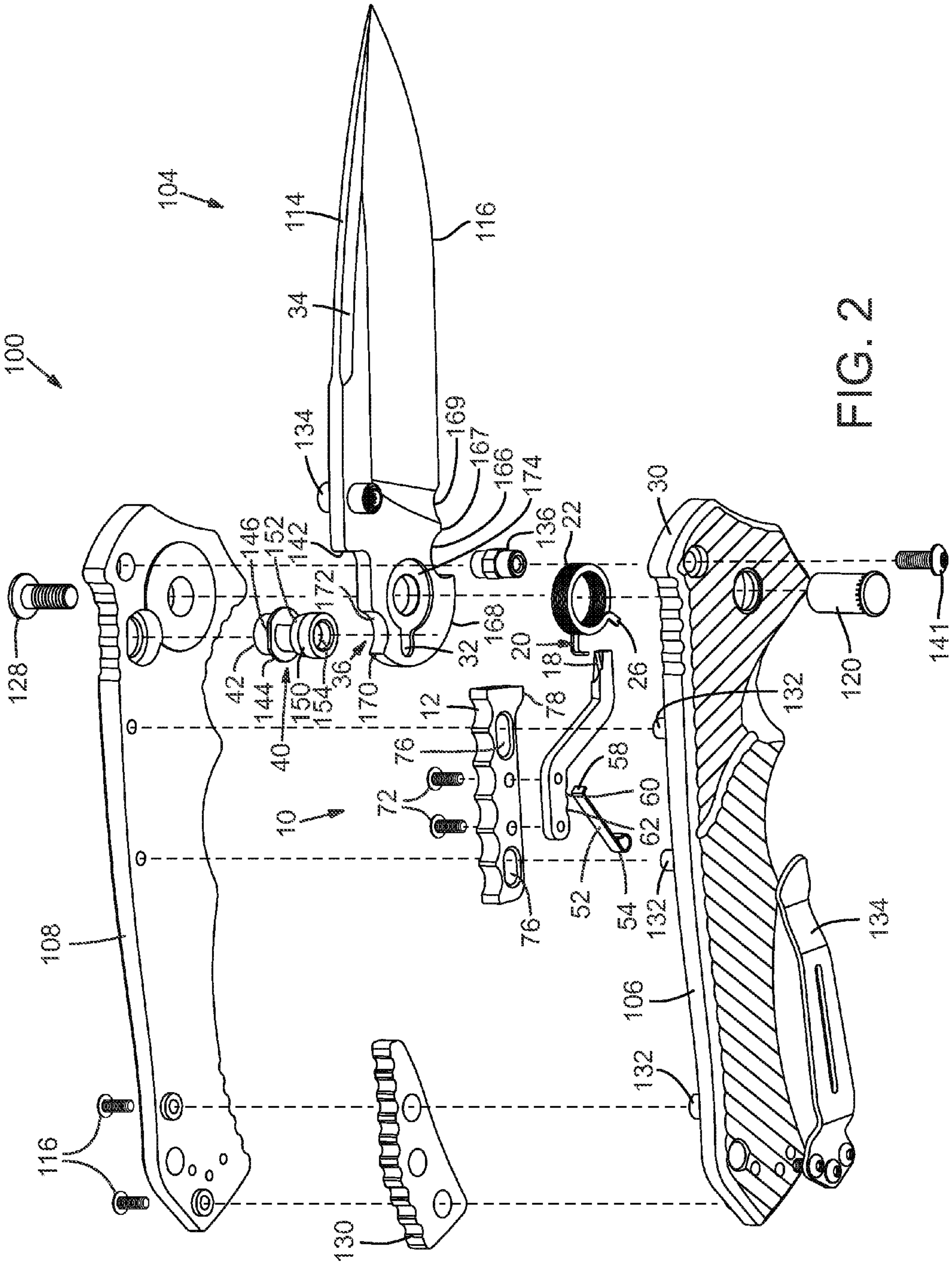
FIG. 2 is an upper perspective and exploded view of the knife shown in FIG. 1, illustrating the right side of the knife.

Folding knife 100 includes an elongate handle 102 that is defined by separate handle halves 106 and 108, and a blade 104 that is pivotally attached between the handle halves at one end of the handle—referred to herein as the "forward" end 110 of the handle 102. Other relative directional terms used herein correspond to this convention: the "rear" or butt end of the handle 112 is opposite the forward end 110; the "upper" part of the blade 114 is the dull, non-working portion and the "lower" part of the blade 116 is the sharpened, working portion; "inner" or "inward" refers to the structural center of the knife, and so on. FIGS. 1 and 2 show the knife 100 with the blade 104 in the open position and the components in an exploded view. It will be appreciated that when the components are assembled into a finished knife 100, the handle halves 106 and 108 are attached to one another in a conventional manner (such as with plural screws 116) with the blade pivotally attached to the handle halves 106 and 108 with a blade pivot pin 118 that is defined by a cylindrical, internally threaded sleeve 120 that extends through a bore 122 in handle half 106, a pivot axis bore 124 in the tang of blade 104, and a counter bored bore 126 in handle half 108. A screw 128 threads into the internal threads of sleeve 120 to secure the blade 104 in a pivotal attachment to the handle 102. In the assembled knife 100, the handle halves 106 and 108 are held in a spaced apart relationship with spacers such as back spacer 130 to define a blade-receiving groove 132 between the handle halves 106, 108. The blade 104 is pivotally mounted so that the blade may be pivotally rotated about the blade pivot pin 118 between the open and closed positions as with a conventional knife.

An X-Y-Z axis grid is shown in FIG. 1. The X-Y plane is defined as the plane parallel to the plane defined by the handle 102 and blade 104—the blade travels in the X-Y plane as it is rotated between the closed and open positions. The Z plane is the plane transverse to the X-Y—the blade pivot pin 118 extends longitudinally in the Z-plane.

In addition to back spacer 130, the plural screws 116 thread into stand offs 132 on the interior surface 132 of handle half 106—the stand offs 132 are cylindrical members that have a threaded internal bore into which screws 116 are threaded. The screws 116 and standoffs 132 secure the back spacer 130 between the handle halves 106 and 108 to maintain the handle 102 in a secure relationship with the blade receiving groove 132 between the halves.

Handle halves 106 and 108 may be fabricated from any suitable material such as a reinforced synthetic plastic; other suitable materials include metal, other plastics, wood, etc. The handle halves may be fabricated in singled or multiple pieces. As shown in FIG. 1, an optional pocket clip 134 may be included if desired—the clip is attached to the exterior surface of handle half 106.

The blade 104 is pivotally attached to the handle 102 near the forward end 110 of the handle. The blade used with knife 100 may be of any known type. The blade 104 shown in the drawings comprises an elongate working portion shown generally at 34 and a tang portion, shown generally at 36. A thumb lug 134 may be included on blade 104 to assist with opening and closing the blade, especially as detailed below with opening the blade when the knife 100 is in the manual mode of operation.

Blade 104 is attached to handle 102 such that the blade's working portion 34 extends away from the handle 102 when the blade 104 is in its open position (FIG. 1), and tang portion 36 is located within the blade receiving groove 132 between the paired handle halves 106 and 108 when the blade is in either the open or the closed position. That is, the tang portion 36 is always located between the handle halves 106 and 108 of handle 102.

A blade stop pin 136 has its opposite ends anchored in counter bored holes 138 (only one of which is shown in the view of FIG. 1) formed in handle halves 106 and 108 and held in place with a screw 141. The blade stop pin 136 functions to stop the rotation of blade 104 when the blade is in the fully open position as shown in FIG. 1. In this position, a shoulder 142 on blade 104 makes contact with the blade stop pin. As detailed below, when the shoulder 142 abuts blade stop pin 136, the knife 100's locking mechanism locks the blade 104 in the open position.

As detailed below, knife 100 is operable in an automatic mode and to facilitate operation in that mode, the assembly includes a spring 22 that engages the blade to drive the blade from the closed position to the open position. Structure and operation of the knife 100 in the automatic and manual modes is described in detail below. The knife 100 also incorporates a locking mechanism for locking the blade in the open position. The locking mechanism is defined by a blade release button 40, which also defines the trigger mechanism (shown generally at 140) for releasing the blade 104 when the knife 100 is in the automatic mode to drive the blade 104 from closed to open.

Trigger mechanism 140 includes a blade release button 40 (also referred to a "bolt 40") that is spring-loaded and extends in a transverse direction between handle halves 106 and 108, parallel to blade pivot pin 118 (i.e., parallel to the Z axis). The release button 40 is shown in isolation in FIG. 4B and is largely conventional for release buttons for automatic knives. The release button 40 and comprises three separately identifiable structural features that together define the button: a button end, a locking end, and a shank that interconnects the two ends. As detailed herein, the release button serves dual functions. Thus, it serves to release the blade so that the blade may be moved between the open and closed positions. Second, it serves to lock the blade in both the open and closed positions. As such, the release button 40 may aptly be called a release/lock bolt.

The first structural feature of release button 40 is a button end 42 that is at the proximate end of the bolt and which is exposed out of handle half 108 in the assembled knife and which is operable by a user—depressed into the knife handle 102—to open the knife. A flange 144 having a diameter greater than the diameter of button end 42 extends radially around the base of the button end 142 of release button 40 and functions to retain the release button when it is housed in the assembled knife. Flange 144 has a flattened portion 146 that, as detailed below, maintains the position of bolt 40 relative to handle 102 and prevents the bolt from rotating relative to the handle.

The second structural feature of bolt 40 is the end of the bolt opposite of end 42, on the distal end of the bolt, which defines a locking body 148. Locking body 148 has a large diameter portion 150. Immediately adjacent the larger diameter portion is a tapered sidewall portion 152. The diameter of tapered sidewall portion 152 decreases gradually from the relatively larger diameter moving from the distal toward the proximate end to a second tapered portion 155. Locking body 148 has a hollow base, shown generally at 154, which houses a spring (not shown). The release button 40 described herein and used with the present invention is identical to the release button described in detail in US Patent Publication No. 2013-0125403 A1 (U.S. patent application Ser. No. 13/347,042), which is owned by the assignee of the present invention and the entire contents of which are incorporated herein by this reference.

Figure 4A:
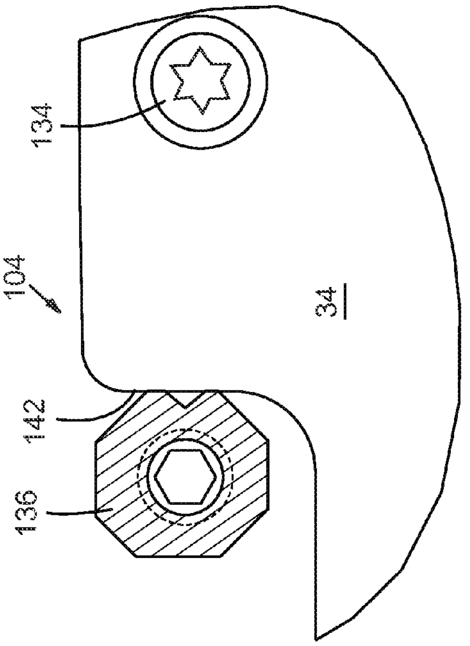
FIG. 4A is a fragmentary view of the stop pin used in the knife of the present invention, showing the blade in the open position. The stop pin used herein is of the type described in U.S. Pat. No. 7,278,213, the disclosure of which is incorporated herein by this reference.
Figure 4B:
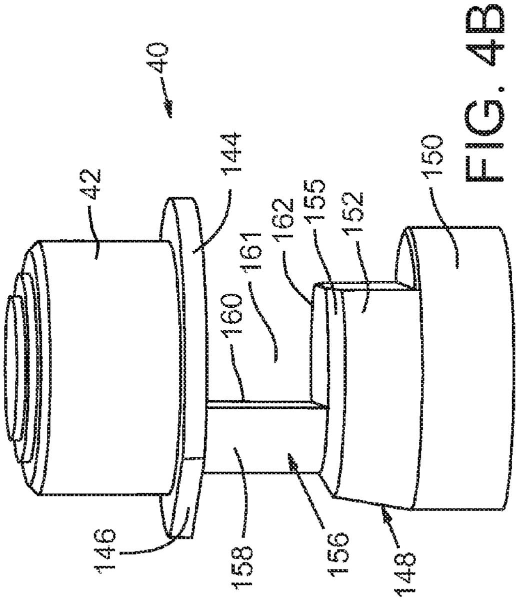
FIG. 4B is a perspective view of the release button incorporated in the knife of the present invention, the release pin operable to automatically open the blade when the knife is in the automatic mode and to lock the blade in the open position.

The third structural feature of bolt 40 is an off-center shank 156 that interconnects proximate end 142 to locking body 148. The off-center shank 156 is defined by a cylindrical outer wall portion 158 that extends partially around the perimeter of the bolt 40 and a flattened central portion 160 that extends across the bolt transversely to the longitudinal axis through the bolt. The cylindrical outer wall portion 158 follows the same outer periphery as the outer peripheral wall of button end 40, and also the outer peripheral dimension of tapered sidewall portion 152 measured the "upper" limit of the tapered sidewall portion—that is, at an edge portion. As shown in FIG. 4B, the mass of material that makes up shank 156 does not extend past the axial centerline that extends through bolt 40. Thus, flattened central portion 160 transects bolt 40 in a position such that the shank 156 occupies less than 50 percent of the diameter of bolt 40 measured at the edge 162 where tapered sidewall portion 152 ends and shank 156 begins. Off-center shank 156 thus defines a passageway 161 through bolt 40 through which portions of the tang 36 of blade 104 travels as the blade moves between the open and closed positions.

Bolt 40 is preferably fabricated from a strong metal so it can withstand the rigors of repeated use, and preferably is monolithic. The bolt may be formed in any appropriate manner, for example by machining, molding or casting.

As best shown in FIG. 1, in the assembled knife 100, the larger diameter portion 150 of bolt 40 is received in cylindrical, dead-end cavity 162 formed in handle half 106 with a compression spring (not shown) received in the hollow base 154 in the larger diameter portion 150. The diameter of cavity 162 is slightly greater than the diameter of larger diameter portion 150. This allows the bolt 40 to move in an up and down fashion in the cavity (back and forth along the Z axis), as described below. The opposite end of bolt 40, that is, button 42 extends through a bore 164 in handle half 108 such that the button is exposed to the exterior of the knife 100. Not visible in FIG. 1, but inwardly of bore 164 and axially communicating with bore 164 is an interior bore portion in handle half 108. The diameter of this interior bore is slightly larger than the diameter of flange 144. The diameter of bore 164 is less than the diameter of the interior bore, defining a lip. The diameter of interior bore at the lip is smaller than the diameter of flange 144. Bolt 40 is thus retained in handle 102 with the flange 144 positioned interiorly of bore 164, and as such, bolt 40 is retained in the handle and cannot be removed from the handle by virtue of the flange 144. The spring that resides in the cavity 162 and in the hollow base 152 of the larger diameter portion 150 at all times urges bolt 40 away from handle half 106. As noted, flange 144 includes a flattened portion 146. A corresponding portion of bore 164 is similarly flattened. Accordingly, when bolt 40 is assembled with the handle halves 106 and 108 as detailed above and as shown in FIG. 1, the flattened portion 146 of flange 144 is mated with and aligns with the flattened portion of bore 164. This face-to-face orientation between the mated flattened portions of flange 144 and bore 164 defines means for preventing rotation of bolt 40 relative to handle 102, and around the longitudinal axis running through the bolt.

It will be appreciated that the position of the flattened portion 144 and the corresponding flattened portion of the bore 164 similarly maintains the position of the flat central portion 160 of shank 156. This arrangement maintains the bolt 40 in the correct axial rotational position at all times relative to handle 102, which allows the trigger mechanism 140 to operate properly. In operation, bolt 40 functions to lock blade 104 in the open position as well as to act as the trigger button. This is accomplished with tapered portion 148 of the bolt engaging a notch 166 of blade 104, as detailed below, thereby preventing the blade from moving from the open position to the closed position without depressing the bolt 40.

Figure 1A:
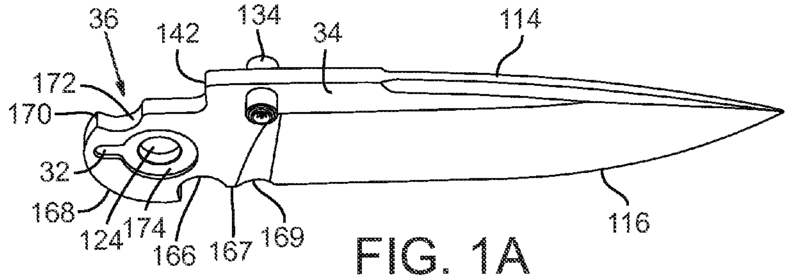
FIG. 1A is a top perspective view of one side of the knife blade—herein, the "right" side—illustrating the tang of the blade and the grooved surface therein.
Figure 3A:
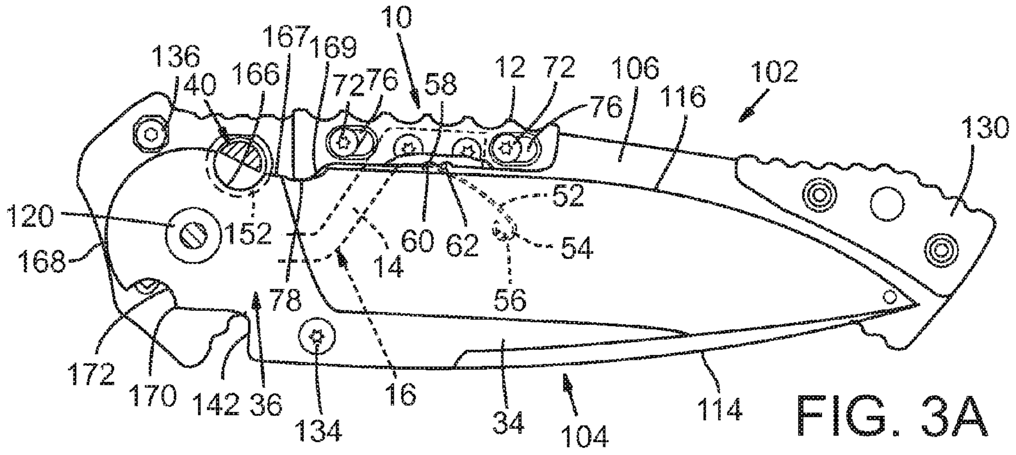
FIG. 3A is a side elevation view of the knife according to the present invention with the blade in the closed position and the near-side handle half removed to expose the blade and other internal structures.
Figure 3:
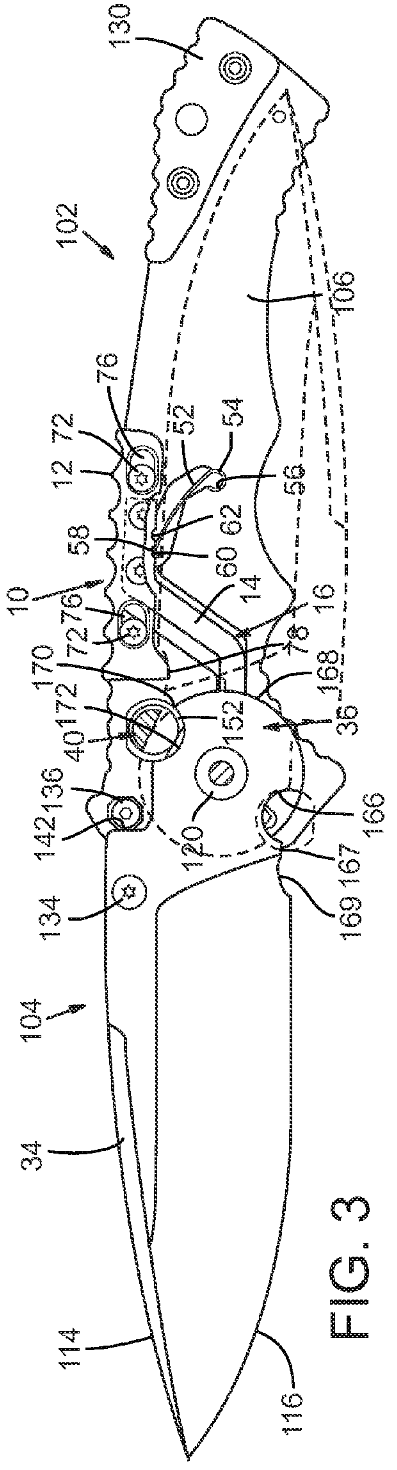
FIG. 3 is a side elevation view of the folding knife shown in FIG. 1 with a portion of the near-side handle removed to expose the blade; the inner side of the right handle half, parts of the switch mechanism and other internal structures of the knife.

Turning to FIG. 1A, the tang 36 of blade 14 will now be described in detail. The description of tang 36 will begin with sharpened edge 116 of blade 104 and will trace the edge of tang 36 in a clockwise direction in FIG. 1A. Sharpened edge 116 of blade 104 terminates at a semi-circular notch 166 that has a shoulder 167 separating the sharpened edge from the notch. Immediately forward of shoulder 167 is a trough 169. Adjacent and rearward of notch 166, the edge of tang 36 defines a curved path 168 that terminates at a shoulder 170, at which point the edge of the tang 36 turns inwardly in the general direction toward pivot bore 124, at about a 90 degree angle, thereby defining a second semi-circular notch 172 that is located roughly opposite notch 166. Continuing in the same clockwise direction, the edge of the tang 36 extends generally in the direction toward the tip of the blade and meets a flattened shoulder 142 that is roughly perpendicular to the top of the blade, and which as noted previously abuts stop pin 136 when the blade is in the open position as best seen in FIG. 3. With continuing reference to FIG. 1A, a recessed shelf 174 is formed entirely around the bore 124 through the tang 36 of blade 104—the recessed shelf is recessed below the level of the remainder of the outer surface of tang 36. A notch 32 extends radially outwardly of the recessed shelf.

At this time, the structures of the mechanisms that define the dual mode opening system will be described in detail.

The switch mechanism 10, that is, the mechanism that allows the user to switch from an automatically opening knife to a manually opening knife, and vice versa, comprises a spacer bar 12 that is connected to a slider bar 14. The spacer bar serves a dual function: it acts as a conventional spacer between handle halves and also functions as the user-manipulated button that operates the knife to switch between automatic and manual modes. The slider bar 14 has a forward end 16 that includes a ramped or angled surface 18 that interacts with the second leg 20 of torsion spring 22, which has a notch 24 that in the automatic mode is disengaged from the angled surface 18 and that in the manual mode is engaged with the angled surface 18.

Each of these components will be described in detail beginning with FIG. 6. Torsion spring 22 is shown in isolation in FIG. 6. The spring is the driving force that applies pressure to the blade 104 to urge the blade from the closed position to the open position when the knife 100 is in the automatic mode. As best seen in FIG. 1, when the components of knife 100 are assembled the cylindrical sleeve 120 of blade axis pin 118 extends through the open center of spring 22 and the spring is received in a round, blind opening 51 formed in the interior-facing surface 131 of handle half 106, around bore 122 through which the blade axis pin 118 extends. A notch 28 is formed in the wall of blind opening 51 and outwardly of the round opening, a radial groove 50 extends partially around the opening, spaced outwardly therefrom. As seen in FIG. 1, the radial groove 50 encircles the opening 51 only partially around the opening, about 270 degrees around the round opening. When spring 20 is received in opening 51, a first leg 26 of the spring that extends outwardly of the coil defined by the windings of the spring is always received and fixed in notch 28.

The second leg 20 of spring 22 is configured to engage the blade 104 when the knife is in the automatic mode and is disengaged from the blade when the knife is in the manual mode. More specifically, with reference to FIG. 6, the second leg 20 is defined by an arm 21 that extends radially outwardly from the center of the coiled windings and which is bent over at 23 terminating with a short extension 25. A notch 24 is formed in the extension 25. Operably, as detailed below, the arm 21 of second leg 20 is movable by forward and aft movement of slider bar 14 into and out of the notch 32 formed in the tang 36 of blade 104 to selectively engage or disengage the blade.

Select components of the switch mechanism 10 and their positions relative to one another are shown in FIGS. 7, 8 and 9. Beginning with FIG. 7, slider bar 14 has a forward or first end 16 that is positioned to interact with the second leg 20 of spring 22. The slider bar may be described as extending rearwardly from the first end 16 and continuing to an angled portion 30 that angles upwardly relative to the first end, and then a connecting portion 32 that is rearward of the angled portion 30. A pair of holes 34, 36 is formed through the connecting portion 32 and a pair of detents 60, 62 is formed in the lower side 64 of connecting portion 32. As best seen in FIGS. 1 and 7, a leaf-type spring 52 has a first end 54 that is fixed in a cavity 56 in handle half 106 and a second end 58 that interacts with detents 60 and 62 in the lower side 64 of spacer bar 12 as the spacer bar is moved forward and aft relative to the handle (arrows A and B, FIG. 7) so that there is a "positive" stop for the spacer bar as it moves relative to the handle 102.

The forward end 16 of slider bar 14 is machined to define a ramped or angled surface 18 that interacts with and engages notch 24 of second leg 20 of spring 22 as the slider bar is moved relative to the handle. The slider bar defines a longitudinal axis along its length. The angled surface 18 is defined by a machined-out portion on the forward end 16 that forms a ridge 66 in the upper surface 68 of the slider bar 14. As best seen in FIG. 8, ridge 66 is angularly displaced across upper surface 68 relative to the longitudinal axis of the slider bar and extends from a curved base portion 70 in the forward direction to the forward end 16, where the ridge 66 terminates near the middle of the upper surface 68.

Turning to FIG. 9 it may be seen that spacer bar 12 is attached to the connecting portion 32 of slider bar 14 with a pair of screws 72 that extend through holes formed in the spacer bar and which thread into the holes 34, 36 in the slider bar. A pair of generally oval-shaped bores 76 is formed through spacer bar 12 near the forward and rearward ends thereof, respectively. A lobe 78 is formed on the lower facing surface of the forward end of the spacer bar 12. As detailed below, the lobe 78 functions as the closed stop that stops rotation of blade 104 as it rotates to the closed position. And as also detailed, there is a dual position closed stop functionality provided by lobe 78.

In FIG. 1 it may be seen that the components of the switch mechanism 10 just described are received in a cavity 74 formed in the interior-facing surface of handle half 106 that is cooperatively formed to receive the components of the switch mechanism, and to allow the moving components to move relative to the handle. In the assembled knife 100, slider bar 14 is received in cavity 74 and the first end of 54 of leaf spring 52 is received in cavity 56, which connects to cavity 74 so that the body of the leaf spring is received in the handle. As noted, the second end 58 of spring 52 engages the lower side 64 of connecting portion 32 of slider bar 14 so that the second end 58 interacts with detents 60 and 62 as the slider bar moves forward and aft relative to the handle 102. Standoffs 132 on the interior surface 131 of handle half 106 extend through the oval-shaped bores 76 at the forward and rearward ends of spacer bar 12 in the assembled knife and screws 116 connect the assembly together.

It will be appreciated that in the assembled knife, spacer bar 12 is held in the blade receiving groove 132 between handle halves 106, 108 and is exposed near the upper margin of the handle so that a user is able to manipulate the spacer bar, the upper exposed surface of which is roughened or knurled. The oval-shaped openings 76 allow the spacer bar to be movable in the forward and aft direction between a forward position and a rearward position, and the slider bar 14 moves directly with movement of the spacer bar since the two are interconnected.

Operation of the switch mechanism 10 to switch knife 100 between the manual mode and the automatic mode will now be explained with particular reference to FIGS. 5A and 5B.

Figure 5B:
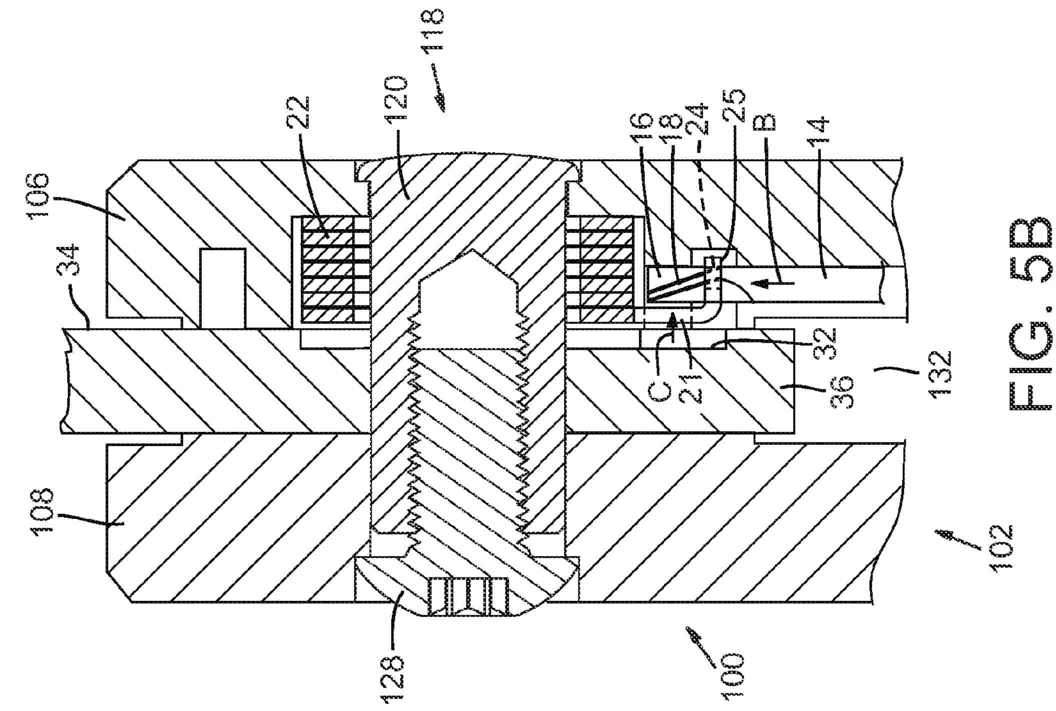
FIG. 5B is a cross sectional view similar to FIG. 5A but illustrating the switch mechanism in the manual position.
Figure 5A:
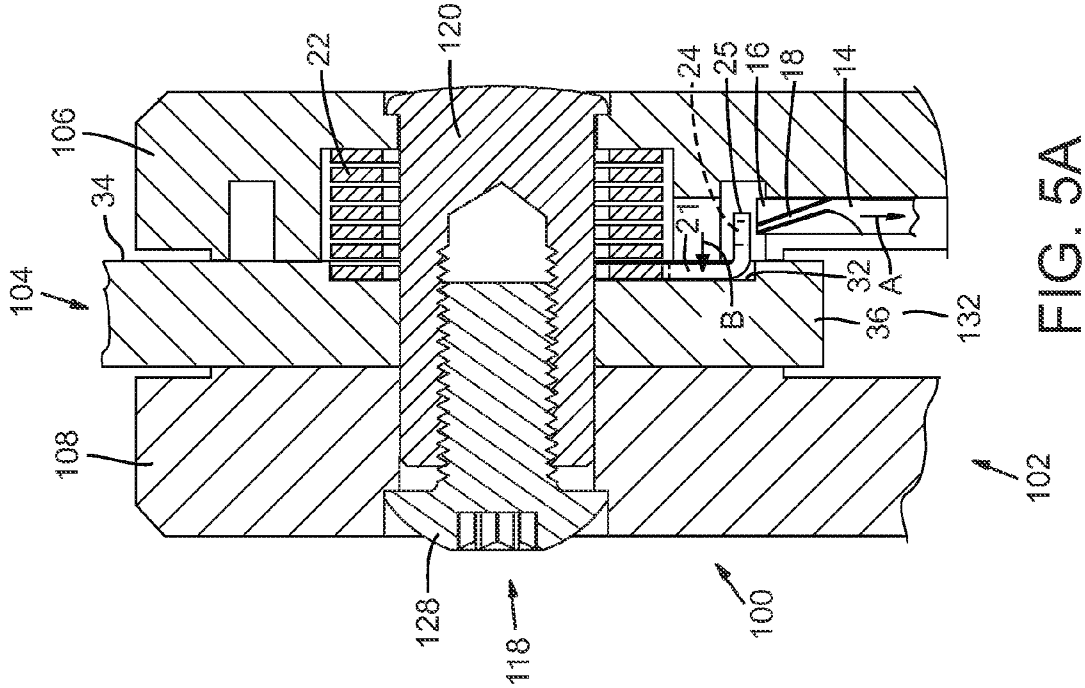
FIG. 5A is a cross sectional view of the tang portion of the knife of the present invention illustrating the blade in the open position and the switch mechanism for moving the blade between the automatic and manual modes in the automatic position.

In both FIGS. 5A and 5B the blade 104 is shown in the open, extended position. In FIG. 5A, the arm 21 of second leg 20 of spring 22 is received in notch 32 of the tang 36 of blade 104. This is the home position of spring 22 as illustrated with arrow B—when there is no engagement between slider bar 14 and spring 22 the second leg 20 is this position. Slider bar 14 (and therefore also spacer bar 12) are positioned in their rearward position relative to the handle, as shown with arrow A in FIG. 5A. In this position, the forward end 16 of slider bar 14 is spaced apart from the second leg 20 of spring 22 and is not engaged with the spring. This is the automatic mode for knife 100. With the spacer bar 12 in this rearward or automatic position, spring 22 is constantly applying rotational force on blade 104 by virtue of the engagement of second leg 20 in notch 32, urging the blade toward the open position. When the blade is in the open position, the spring applies pressure on the blade 104 to maintain it in the open position and the lock bolt 40 is locking the blade open. In this respect, when the blade is in the extended, open position and there is no pressure being applied to the lock bolt 40 by the user, the tapered sidewall portion 152 of the sidewall is engaging the notch 172 formed in the tang 36 of blade 104. Stated another way, the sidewall portion 152 is in the blade's rotational path in the blade receiving groove 132 and thus prevents rotation of the blade from open to closed. This interaction between the lock bar 40 and notch 172 is seen in FIG. 3.

In the automatic mode and with the blade in the open position, the blade may be rotated to the closed position by unlocking the lock and rotating the blade. The closed position is defined by the trough 169 on blade 104 abutting lobe 78 on spacer bar 12 and is best illustrated in FIG. 3A. Because the spacer bar 12 is in the rearward position, as the blade rotates from the open position toward the closed position the shoulder 167 passes and clears lobe 78 and the blade stops rotation when the lobe 78 abuts the sides of the trough 69 as shown in FIG. 3A. In this blade position the lock bolt 40 moves under spring pressure into notch 166 and thus locks the blade securely closed with the tapered portion 152 of the lock bolt fully engaging the notch 166. With the blade locked as shown in FIG. 3A, it cannot be moved out of the closed position without unlocking the blade by pressing on release button 40.

As the blade rotates from open to closed, the tang of the blade rotates through the passageway 161 through bolt 40. At the same time, arm 21 of second leg 20 remains in notch 32 and the spring 22 is thus wound as the blade rotates. This increases the spring pressure applied to the blade so that when the blade reaches the closed position and is held in that position (by lock bolt 40) there is a pre-load of spring pressure being applied to the blade. Accordingly, the blade is ready to fire in the automatic mode.

When lock bar 40 is depressed inwardly into the handle 102 with the blade 104 in the closed position and with slider bar 14 in the automatic position, the blade is driven rapidly by the force of spring 22 unwinding into the fully open position. As the blade is moved between the closed and open positions, the extension 25 of the spring moves through the radial groove 50 formed in handle half 106. The slider bar 14 remains in the automatic position by virtue of second end 58 of spring 52 engaging detent 60 on the slider bar.

In FIG. 5B the knife 100 is in the manual mode—spacer bar 12 and thus slider bar 14 have been moved to the forward or manual position by pushing the slider bar in the direction of arrow B in FIG. 5B. As the slider bar 14 moves forward in this direction (with the blade 104 in the open position) the ridge 66 that defines the ramped portion 18 of forward end 16 of the slider bar enters into and engages notch 24 on the extension 25 of second leg 20 of spring 22. Because ridge 66 is angled relative to the longitudinal axis of the slider bar 14, as the slider bar is moved forward (arrow B), the engagement between ridge 66 and notch 24 causes the entire second leg 20 to be lifted out of the notch 32 of blade 104. Stated another way, and as seen in FIG. 5B, the spring is laterally displaced (in the direction to the right in the view of FIG. 5B) relative to the blade so that the spring is not in contact with the blade. This "lifting" or lateral displacement of the second leg of the spring 22 is illustrated with arrow C in FIG. 5B. Thus, when slider bar 14 is in the forward position shown in FIG. 5B, the knife 100 is in the manual mode because spring 22 is completely disengaged from and makes no contact with the blade 104; spring force is applied only to the slider bar 14 and not the blade. In this manual mode the blade may be moved from open to closed, and from closed to open, only manually without pressure applied to the blade by spring 22. Of course, the locking mechanism defined by lock bolt 40 is fully operational when the knife 100 is in the manual mode and the blade is in the open position and therefore must be manipulated by the user to rotate the blade from open to closed.

As noted previously, the switch mechanism 10 may only be moved from the automatic mode to the manual mode and vice versa when the blade 104 is in the open position. The reason is evident from the drawings: when the blade 104 is in the closed position the second end 20 of spring 22 cannot be lifted out of the notch 32 because there is no corresponding notch overlying the end of the spring in the blade. This provides a de facto safety mechanism: the user must make a decision when the blade is open, choosing either the automatic mode or the manual mode. As an alternative, a second notch could be formed in the tang 36 of blade 104, 180 degrees opposite notch 32. If this were the case, then the user would be forced to choose between the automatic or manual modes when the blade was in the closed position.

The knife 100 described herein allows the blade 104 to be maintained in the closed position with the lock bar 40. However, depending upon the position of switch mechanism 10, the manner in which the blade is retained in the closed position is different. Thus, in a first switch position the blade is retained in the closed position by virtue of a detent mechanism; in a second switch position the blade is retained in the closed position by a lock. The lock bar 40 provides the structural mechanism that both functions as the detent and the lock. As detailed above, when the switch mechanism 10 is in the rearward, automatic position and the blade is in the closed position, the blade is locked in the closed position by the lock bar 40. This occurs when the lock bar fully extends into notch 166 of the blade with the tapered sidewall portion 152 engaging the notch. However, when the switch mechanism 10 is in the forward, manual position and the blade is in the closed position, the blade is not allowed to rotate as far toward the closed position because shoulder 167 on the blade abuts lobe 78 on the spacer bar 12 at an earlier point in the blade's rotational path compared to the stop that occurs when the switch is in the automatic position, and the rotation of the blade toward the closed position is stopped earlier than when the switch is in the automatic position. In this manual position/operating mode, the second tapered portion 155 of release button 40 engages the notch 166 of the blade only slightly, and only enough to detent the blade closed. The blade is not "locked" in this position and the user may overcome the engagement between the blade and the release button by pushing on the thumb lug 134 to move the blade to the open position. The switch mechanism 19 thus acts as a detent for holding the blade closed rather than a lock.

The ability to provide two separate types of closed-lock functionalities is important because it allows the knife 100 to fully function in two completely different modes, manual on the one hand, automatic on the other. Thus, when the switch mechanism 10 is in the manual mode the blade may be moved from open to closed and from closed to open only with the user manually manipulating the blade. The blade is locked open, but is retained closed by a detent that may be overcome with manual manipulation of the blade by the user.

In contrast, when the switch mechanism 10 is in the automatic mode the blade may be moved from closed to open only by the user pushing the trigger defined by lock bar 40; the blade is moved from open to closed by unlocking the lock and rotating the blade to the fully closed position, where it is retained closed by a lock, which is critical since the blade is "loaded" and ready to fire and where the locked closed position may be overcome only by operation of the trigger (i.e., release button 40). The switch mechanism 10 thus defines a mechanism that switches the knife 100 between dual opening modalities, and also switches the knife 100 between dual closed-lock/closed-detent modalities.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A folding knife, comprising:

a handle defined by first and second handle halves held in a spaced apart relationship to define a blade groove therebetween;

a blade pivotally connected between the handle halves with a pivot shaft extending through a bore in a tang portion of the blade so that the blade is movable in a rotational path between an open position and closed position, said blade having a groove extending radially away from the bore on one side of the blade;

a torsion spring around the pivot shaft, said spring having a first end fixed relative to the handle and a second end;

a switch movable between first and second positions, said switch having a surface that in the first position engages the second end of said spring so that said spring is disengaged from the blade, and wherein when said switch is in the second position said surface is disengaged from said spring and said spring is in the groove in the blade and said spring exerts pressure on said blade.

2. The folding knife according to claim 1 including a lock for locking the blade in the open and closed positions.

3. The folding knife according to claim 2 wherein when the switch is in the first position the blade can be moved from the closed to the open position only manually.

4. The folding knife according to claim 3 wherein when the switch is in the second position the blade can be moved from the closed to the open position only automatically.

5. The folding knife according to claim 4 wherein the blade is moved from the closed to the open position by unlocking the lock.

6. The folding knife according to claim 1 wherein the switch can be moved from the first to the second position only when the blade is in the open position.

7. The folding knife according to claim 1 wherein the switch is further defined by an arm member and the surface of said switch that engages the second end of the spring is defined by a ridge formed on said arm member, and wherein the second end of said spring includes a notch formed therein, and when the switch is in the first position the ridge engages the notch to move the second end of the spring out of engagement with the blade.

8. The folding knife according to claim 7 wherein the arm member defines a longitudinal axis and the ridge is angled relative to said longitudinal axis.

9. The folding knife according to claim 7 wherein the switch further defines a member slidably retained between the first and second handle halves.

10. A folding knife having a handle with opposed first and second side walls held in a spaced apart relationship and a blade pivotally connected to the handle between the side walls with a pivot shaft extending through a bore extending through a tang portion of the blade so the blade is movable about the pivot shaft between a closed position and an open position, the improvement comprising:

a radial groove extending away from the bore;

a torsion spring around the pivot shaft, said torsion spring having a first leg fixed to a side wall and a second leg;

a switch movable between first and second switch positions, said switch defining a surface that in the first switch position engages said second leg so that said torsion spring is disconnected from said blade and exerts no pressure on said blade, and wherein when said switch is in the second switch position said surface is disengaged from said second end and said spring is in the radial groove and exerts pressure on said blade.

11. The folding knife according to claim 10 wherein said switch further defines a ridge that engages a notch formed in the second end of the spring when the switch is in the first switch position and said ridge laterally displaces said second end of said spring to disconnect the spring from said blade.

12. The folding knife according to claim 11 wherein said switch defines an axis and said ridge is angularly formed on said switch relative to said axis.

13. The folding knife according to claim 12 wherein the switch is movable from the first switch position to the second switch position only when the blade is in the open position.

14. The folding knife according to claim 12 wherein the switch is movable from the second switch position to the first switch position only when the blade is in the open position.

15. The folding knife according to claim 12 wherein when the switch is in the first switch position the blade may be moved from the closed position to the open position only manually, and wherein when the switch is in the second switch position the blade may be moved from the closed position to the open position only automatically.

16. A folding knife, comprising:

a handle defined by first and second handle halves held in a spaced apart relationship;

a blade pivotally connected between the handle halves with a pivot shaft extending through a bore in a tang of the blade so that the blade is movable in a rotational path between an open position and closed position;

a groove formed in the tang of the blade and extending radially away from the bore;

a torsion spring around the pivot shaft, said torsion spring having a first end fixed relative to the handle and a second end;

a switch means for selectively engaging and disengaging the second end of the spring from the groove.

17. The folding knife according to claim 16 in which the switch means is movable between first and second positions, and wherein in the first position the switch means engages the second end of the spring so that said spring is disconnected from said blade, and wherein in the second position the switch means is disengaged from said spring and said second end of said spring is engaged with said blade.

18. The folding knife according to claim 17 wherein the switch means further comprises an arm configured to laterally displace the second end of the spring relative to the blade to disengage the spring from the blade.

19. The folding knife according to claim 18 in which the switch means is movable between the first and second positions only when the blade is in the open position.

20. The folding knife according to claim 19 including lock means for locking the blade in the closed position and the open position.

* * * * *